United States Patent [19]

Barger

[11] 4,056,093
[45] Nov. 1, 1977

[54] SOLAR HEATER

[76] Inventor: Harold E. Barger, Paxton, Nebr., 69155.

[21] Appl. No.: 638,096

[22] Filed: Dec. 5, 1975

[51] Int. Cl.² ............................................. F24J 3/02
[52] U.S. Cl. ............................................. 126/271
[58] Field of Search ............................. 126/270, 271

[56] References Cited

U.S. PATENT DOCUMENTS

| | | | |
|---|---|---|---|
| 1,093,498 | 4/1914 | Thring | 126/271 |
| 1,672,750 | 6/1928 | Christiansen | 126/271 |
| 1,969,839 | 8/1934 | Goddard | 126/271 |
| 3,321,012 | 5/1967 | Hervey | 126/271 |
| 3,587,559 | 6/1971 | Nonaka | 126/271 |

FOREIGN PATENT DOCUMENTS

| 30,994 | 8/1966 | Japan | 126/271 |
|---|---|---|---|

*Primary Examiner*—John J. Vrablik
*Attorney, Agent, or Firm*—Clarence A. O'Brien; Harvey B. Jacobson

[57] ABSTRACT

A solar heating unit is provided including an upwardly opening generally hemispherical double wall boiler including spaced inner and outer hemispherical walls defining a closed chamber therebetween in which to receive a liquid to be heated. An upwardly convex spherical lens structure is supported over the boiler and comprises a closure for the area enclosed within the boundaries of the inner hemispherical wall of the boiler and the lens assembly or structure functions to direct light rays incident thereon onto the inner wall of the boiler. The solar heater additionally includes a hollow downwardly opening transparent hemispherical cover of generally the same radius of curvature as the boiler and which is secured over the lens assembly in outwardly spaced position relative thereto with the center of curvature of the cover substantially coinciding with the center of curvature of the lens assembly. Water or other liquid inlet and outlet structure is provided on a second form of the invention for admitting liquid to be heated into the interior of the boiler between the inner and outer plates thereof and for withdrawing heated liquid from within the boiler.

4 Claims, 2 Drawing Figures

SOLAR HEATER

BACKGROUND OF THE INVENTION

Many different forms of solar heaters have been heretofore provided for the purpose of heating a working liquid. However, most stationarily supported solar heaters operate at extremely low efficiency during the first three or four hours after sunrise and the three or four hours preceding the setting of the sun and enjoy reasonable efficiency only during the several hours bridging the time at which the sun is at its highest point. Examples of various forms of solar heaters designed to enjoy greater efficiency throughout the entire period between sunrise and sunset are disclosed in U.S. Pat. Nos. 2,455,834, 2,636,129, 2,872,915, 2,918,023 2,993,125, 3,125,091 and 3,391,688.

However, these previously patented solar heaters do not provide maximum efficiency with relatively simple structure which may be produced at a low cost.

BRIEF DESCRIPTION OF THE INVENTION

The solar heater of the instant invention utilizes a simple convex hemispherical boiler assembly in which liquid is disposed for absorbing heat energy from the sun. In a first form of the invention the boiler is sealed and in a second form liquid to be heated may be pumped through the boiler. A sunlight concentrating lens structure of hemispherical design is provided over the boiler to concentrate the sun's rays on the boiler assembly throughout the period from sunrise to sunset. Also, downwardly opening hollow hemispherical cover is provided over the lens assembly to reduce heat losses.

The main object of this invention is to provide a solar heater which will be capable of efficient operation throughout substantially the entire time between sunrise and sunset on a cloudless day.

Another object of this invention, in accordance with the immediately preceding object, is to provide a solar heater which may be utilized in conjunction with a heat absorptive and retaining material for the purpose of storing appreciable quantities of heat for use between the hours of sunset and sunrise.

Still another important object of this invention is to provide a solar heater which may be usable in numerous environments where the generation and storage of heat is desired.

A final object of this invention to be specifically enumerated herein is to provide a solar heater in accordance with the preceding objects and which will conform to conventional forms of manufacture, be of simple construction and easy to use so as to provide a device that will be economically feasible, longlasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
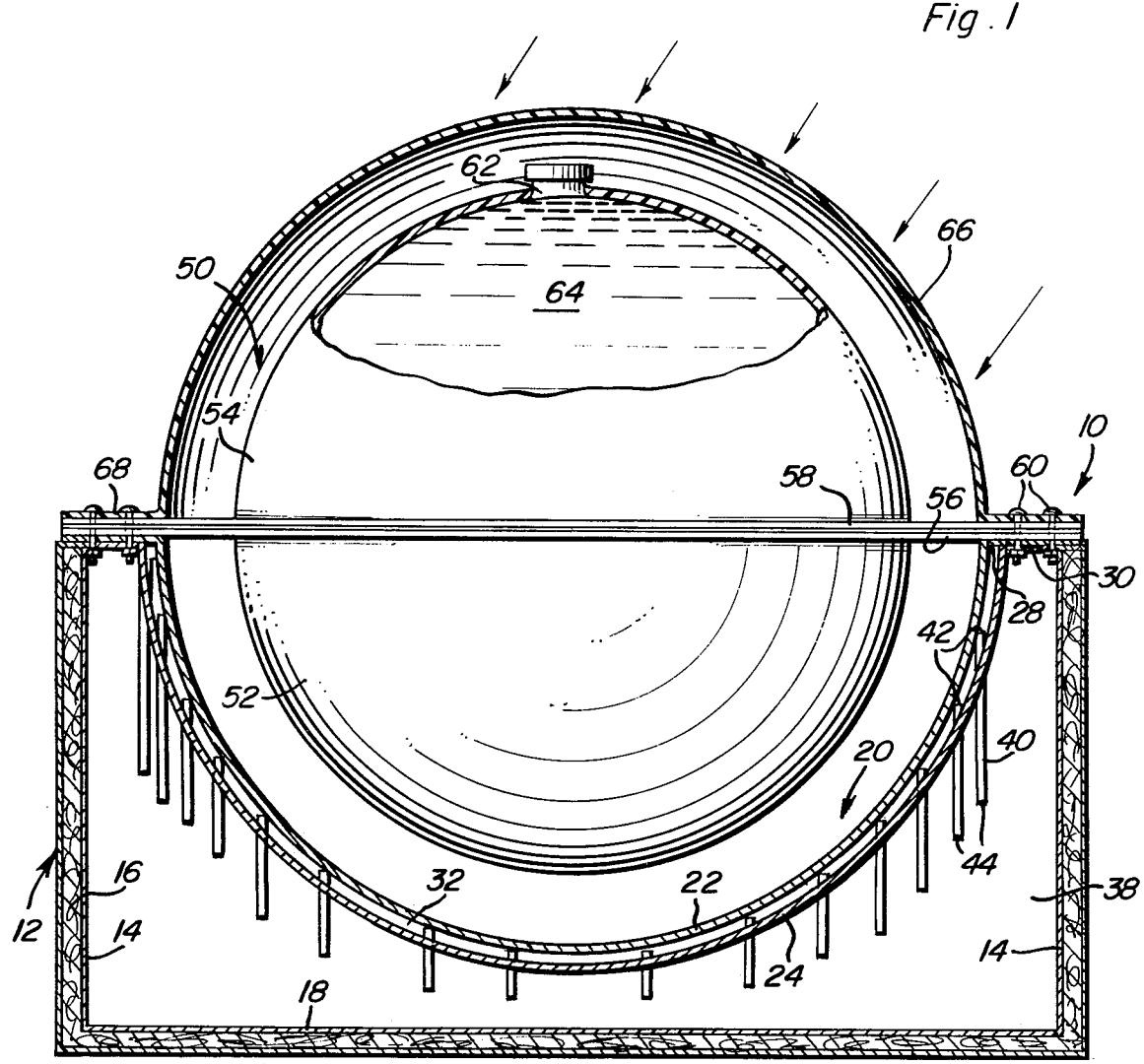
FIG. 1 is a vertical sectional view substantially upon a plane passing through the center of a first form of solar heater constructed in accordance with the present invention.

Referring now more specifically to the drawings the numeral 10 generally designates a first form of solar heater constructed in accordance with the present invention. The solar heater 10 includes an upwardly opening generally rectangular housing referred to in general by the reference numeral 12 including interconnected upstanding peripheral walls 14 provided with insulation 16 and having an insulated bottom wall 18 extending between and interconnecting the lower ends of the peripheral walls 14.

An upwardly opening hemispherical boiler assembly referred to in general by the reference numeral 20 is provided and includes closely radially spaced inner and outer hemispherical plates 22 and 24 joined at corresponding marginal edge portions thereof as at 28 and supported from a mounting plate structure 30 secured over and supported from the upper ends of the peripheral walls 14 and having a central opening formed therein in which to receive the marginal portions of the outer plate 24.

The space 32 defined between the plates 22 and 24 defines a water chamber in which water, or other fluid to be heated, is disposed and the fluid is admitted into the space through any suitable inlet, not shown.

The interior 38 of the housing 12 inwardly of the walls 14 and 18, below the mounting plate structure 30 and outwardly of the boiler assembly 20, defines a chamber which may be filled with any suitable fluid such as a eutectic solution and a plurality of "heat pipes" 40 include upper portions 42 thereof disposed in the chamber 32 and lower portions 44 thereof disposed within the interior 38 of the housing 12. The "heat pipes" 40 are sealingly secured through the outer plate 24.

A spherical lens assembly referred to in general by the reference numeral 50 and including a pair of hollow hemispherical bodies 52 and 54 opening toward each other is provided. The bodies 52 and 54 include diametric mounting plate portions 56 and 58 at the open sides thereof and the mounting plate portions 56 and 58 are secured together in juxtaposition in fluid-tight sealed engagement and the mounting plate portions 56 and 58 are secured to the mounting plate structure 30 by means of suitable fasteners 60. The center of curvature of the spherical lens assembly 50 coincides with the center of curvature of the inner and outer walls of the boiler assembly 20 and the upper hemispherical body 54 includes a removably capped inlet neck 62 through which a transparent liquid 64 may be introduced into the lens assembly 50.

In addition, a downwardly opening hollow hemispherical and transparent cover 66 including a mounting plate portion 68 extending about its open side is secured over the lens assembly 50 in spaced relation relative thereto with the mounting plate portion 68 also secured to the mounting plate structure 30 by means of the fasteners 60. The cover 66 is transparent and may also act as a first lens element in addition to a means to insulate the lens assembly 50 against a heat dissipation therefrom.

In operation, the sun's rays incident upon the cover 66 and the lens assembly 50 are concentrated onto the inner plate 22 of the boiler assembly 20 thereby heating the inner plate 22 and the water or other liquid within the chamber 32. The "heat pipes" 40 rapidly conduct heat from the liquid in the chamber 32 to whatever heat absorbing and storing medium is disposed within the interior 38 of the housing 12 and any suitable means, such as additional "heat pipes" may be used to withdraw heat from the heat storing medium disposed within chamber 38.

Figure 2:
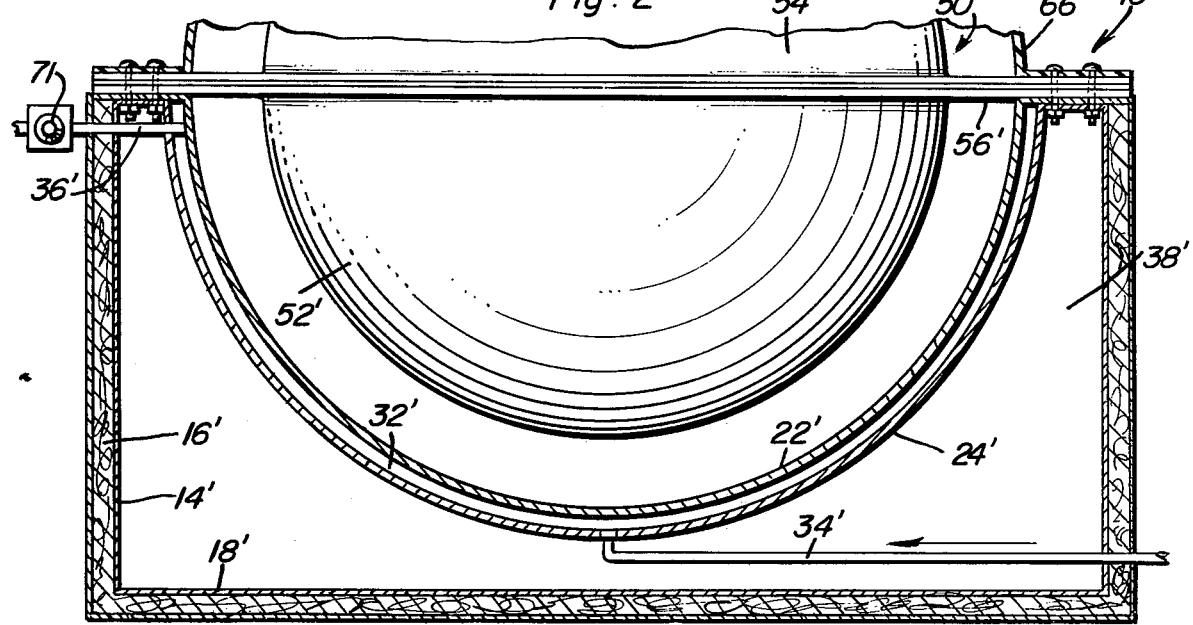
FIG. 2 is a fragmentary vertical sectional view similar to FIG. 1 but of a modified form of solar heater.

With reference now more specifically to FIG. 2 of the drawings, there will be seen a modified form of solar heater referred to in general by the reference 10' and which includes many of the structural features of the solar heater 10. Those features of the heater 10' which are identical to corresponding elements of the heater 10 are designed by similar prime reference numerals.

The basic difference between the heaters 10 and 10' is that the heater 10' does not include the equivalent of the "heat pipes" 40. Further, an upper outlet pipe 36' is provided and includes a manually adjustable thermostat valve 71 for controlling the flow of liquid from the chamber 32, and a lower inlet pipe 34' is provided and opens into the lower portion of chamber 32'. A suitable heat transfer liquid may be pumped through the chamber 32' in order to convey the heat absorbed within chamber 32' to be used at a remote point with which the ends of the lines 34' and 36' remote from the chamber 32' are communicated. The thermostat 71 insures that liquid will not be discharged from the chamber 32' through the pipe 36' until such time as the liquid has been heated to a predetermined minimum temperature. Otherwise, the operation of the solar heater 10' is similar to the operation of the solar 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an upwardly opening generally hemispherical double wall boiler including closely radially spaced inner and outer hemispherical walls defining a closed chamber therebetween in which to receive a liquid to be heated, a hollow transparent spherical lens body of smaller outside diameter than the inside diameter of said boiler, supported concentrically from the upper peripheral portion of said boiler and closing the latter from above and filled with a transparent liquid, a downwardly opening hemispherical and transparent hollow cover secured over said transparent spherical lens in spaced relation thereto and with the centers of curvature of said spherical lens, inner and outer hemispherical walls and said cover substantially coinciding.

2. The combination of claim 1 including an upwardly opening housing across whose open top said boiler is secured with the exterior of said boiler spaced from the inner surfaces of said housing and thereby defining a heat storage area in which a heat absorbing and storing material may be housed, and heat exchange means including first and second portions thereof disposed within said area and chamber and operative to convey heat from the former to the latter.

3. The combination of claim 1 including means for admitting fluids to be heated into a lower portion of said closed chamber and withdrawing heated fluids from an upper portion of said chamber.

4. The combination of claim 3 including a thermostatically actuated valve controlling the flow of fluids through said means for withdrawing heated fluids from said chamber.

* * * * *